United States Patent [19]

Amey

[11] Patent Number: 5,065,651

[45] Date of Patent: Nov. 19, 1991

[54] METHOD AND MACHINE FOR FINISHING COMMUTATORS

[75] Inventor: Louis F. R. Amey, Winchester, Mass.

[73] Assignee: McCord Winn Textron Inc., Winchester, Mass.

[21] Appl. No.: 374,186

[22] Filed: Jun. 30, 1989

[51] Int. Cl.[5] .......................... B23C 3/00; B24B 7/04

[52] U.S. Cl. .......................................... 82/1.11; 82/18; 51/5 C; 51/108 R; 51/281 SF

[58] Field of Search ............... 51/323, 281 R, 281 SF, 51/326, 328, 106 R, 108 R, 5 B, 5 C, 132, 134, 244; 82/1.11, 18

[56] References Cited

U.S. PATENT DOCUMENTS

| | | | |
|---|---|---|---|
| 1,518,971 | 12/1924 | Edwards | 51/108 |
| 4,525,957 | 7/1985 | Daniels | 51/131.1 |
| 4,640,651 | 2/1987 | Runyon | 51/132 |
| 4,825,596 | 5/1989 | Kinner | 51/132 |

*Primary Examiner*—Robert A. Rose
*Attorney, Agent, or Firm*—John C. Evans

[57] ABSTRACT

A method for finishing the full radial surface of a face-type commutator includes relatively rotating the commutator on its axis with respect to a cutter to form a finish on the commutator face which includes radially inwardly cross hatch segments which become progressively open toward the outer periphery of the commutator and which end in a series of generally radially directed single line segments at the radially outer portion of each of the conductor segments of the commutator so as to dress slot edged during cutting to prevent formation of slot burrs; thereafter brushing the commutator face to remove loose chips therefrom followed by finishing the surface to remove irregularities therefrom and to form surface roughness thereon for brush run-in. The apparatus includes a rotary dial having a plurality of rotatable workholders thereon each carrying one commutator and wherein a cutter spindle, rotary brush and an abrasive wheel spindle are located at circumferentially spaced points around the periphery of the rotary dial to perform the functions of the method.

3 Claims, 3 Drawing Sheets

METHOD AND MACHINE FOR FINISHING COMMUTATORS

FIELD OF THE INVENTION

This invention relates to a method and apparatus for practicing a method for finishing radial face type commutators without formation of slot burrs and more particularly to surface treatment methods and apparatus for forming a desired wear-in surface on such commutators.

BACKGROUND OF THE INVENTION

U.S. Pat. No. 4,525,957 issued July 2, 1985 for Apparatus and Method for Finishing Radial Commutator discloses a grinding method for finishing the face surfaces of conductor segments of a radial face type commutator following a facing operation in which the surfaces of the conductor segments are fixtured on a lathe having a single point cutter passed laterally of the conductor segments to remove a predetermined depth of material from the conductor segments in preparation for a grinding step which forms a roughness pattern on the commutator suitable for run-in of brush components associated with the commutator in a brush commutated electric motor assembly. Such lathe operations have resulted in the formation of slot burrs between each of the conductor segments.

In order to finish such commutators it has been necessary to provide a separate cleaning step in which a knife tool is drawn through each of the commutator slots to remove burrs therefrom. U.S. Pat. No. 4,686,730 issued Aug. 18, 1987 for Semi-Automatic Armature Assembly Slot Cleaner discloses a tool which has a plurality of blades that will simultaneously clean all of the slots in a machined and assembled commutator assembly so as to remove slot burrs and thereby provide a face configuration for finishing in accordance with U.S. Pat. No. 4,525,957.

SUMMARY OF THE INVENTION

The subject invention is directed to a method of cutting the surface of conductor segments of a radial face type commutator to remove a desired thickness of metal therefrom without forming slot burrs so as to eliminate the need for subsequent knife edge cleaning of a slot to remove burrs therefrom.

A feature of the invention is that of relatively rotating a plurality of cutter inserts across the surface of a radial face type commutator to simultaneously remove material from each of the conductor segments by a sweeping motion which prevents slot burrs; a further feature of the invention is to prevent slot burrs by forming a tool pattern on the commutator surface which includes radially inwardly located cross hatch segments which become progressively open toward the outer periphery of the commutator and which end in a series of generally radially directed single line segments at the radially outer portion of each of the conductor segments of the commutator.

Another feature of the invention is to provide the method of the preceding paragraph in which the roughly cut commutator surface is brushed to remove loose chips therefrom followed by abrasive wheel finishing of the surface to remove irregularities therefrom and to provide a brush wear-in finish.

Another feature of the present invention is to provide apparatus which includes a rotary dial having a plurality of rotary workholders thereon, each carrying one commutator and wherein a cutter spindle, rotary brush and an abrasive wheel spindle are located at circumferentially spaced points around the periphery of the rotary dial to perform the functions of the preceding features of the inventive method.

PRIOR ART STATEMENT

U.S. Pat. Nos. 4,686,730 and 4,525,957 disclose apparatus and a method to form face type commutators with individual conductor segments thereon which are finished by an initial step in which burr slots are formed.

U.S. Pat. Nos. 969,633 and 3,965,623 disclose grinders which are designed to finish the surfaces on individual commutator bars located at circumferentially spaced points on a ring type cylindrical motor commutator. There is no suggestion that the apparatus or methods of such grinders provide for uniform grinding which will result in a controlled the pre-machining of the present invention to prevent slot burrs followed by roughness over the full planar extent of a flat, radial face type commutator.

U.S. Pat. No. 325,296 discloses a machine with a workholder spindle and a cutting tool with an axis offset from the axis of a tool dish and wherein the cutting tool is operative to form a recess in the face of the dish. The '296 patent does not suggest a grinder apparatus with a multi-point cutter which will produce a tool wear pattern on the wear surface of a radial type commutator that will eliminate slot burrs therein. Further, it does not teach finishing a radial face type commutator to control brush wear-in.

BRIEF DESCRIPTION OF THE DRAWINGS

Other advantages of the present invention will be readily appreciated as the same become better understood by reference to the following detailed description when considered in connection with the accompanying drawings wherein.

DESCRIPTION OF PREFERRED EMBODIMENT

Figure 2:
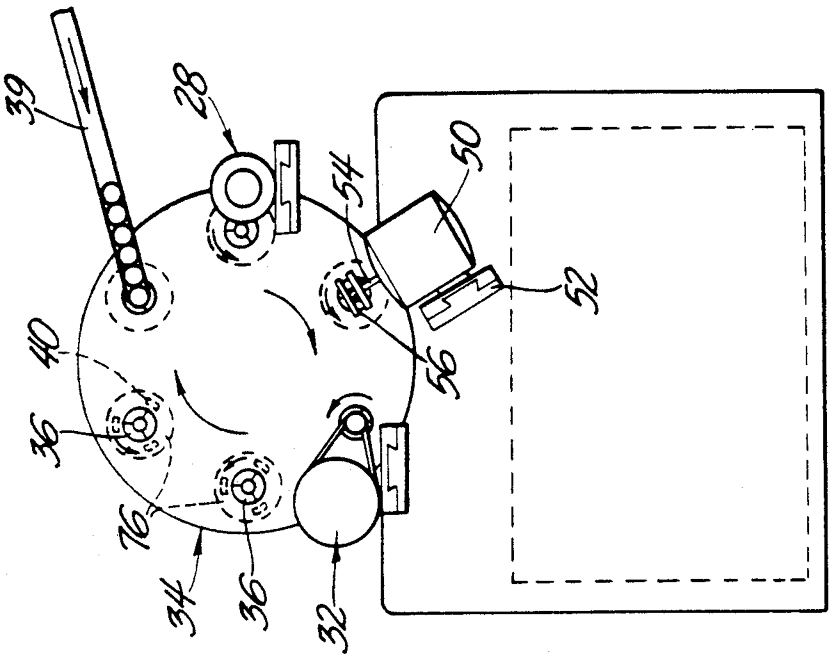
FIG. 2 is an end elevational view of the apparatus of FIG. 1.
Figure 1:
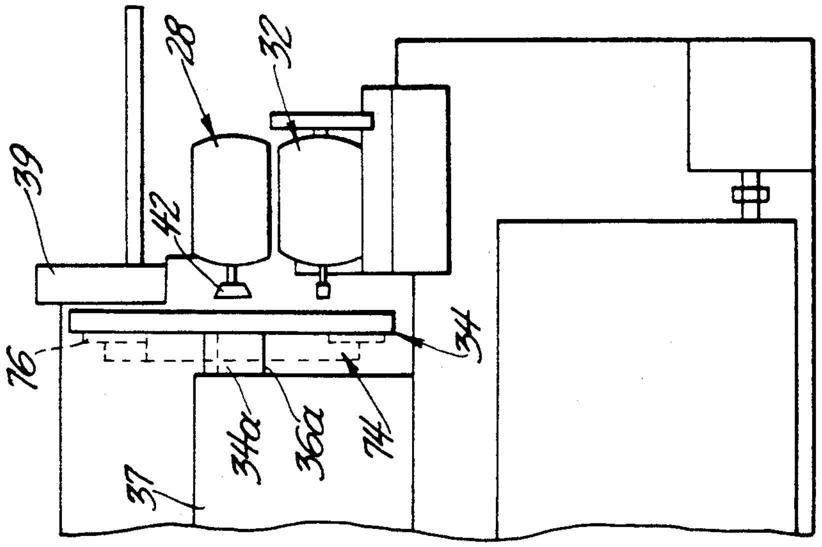
FIG. 1 is a side elevational view of apparatus for finishing commutators in accordance with the invention.
Figure 3:
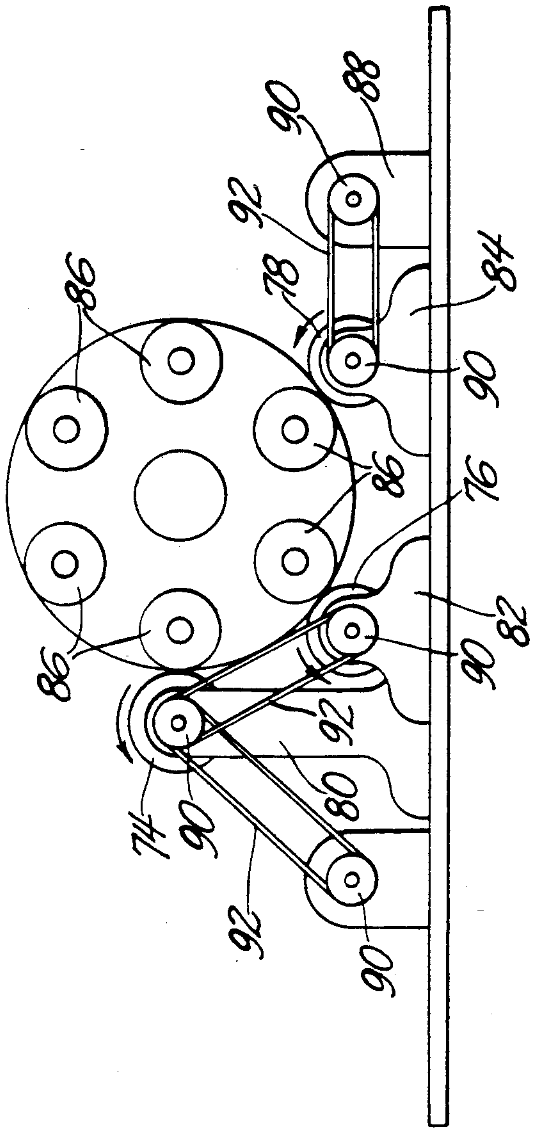
FIG. 3 is a back view of a rotary dial in FIGS. 1 and 2.

FIGS. 1—3 show machine apparatus 10 constructed in accordance with the present invention.

The machine apparatus 10 is operative to finish a radial face type commutator 12 having a plurality of soft metal electrically conductive conductor segments 14 with radially extending faces 16.

Figure 4:
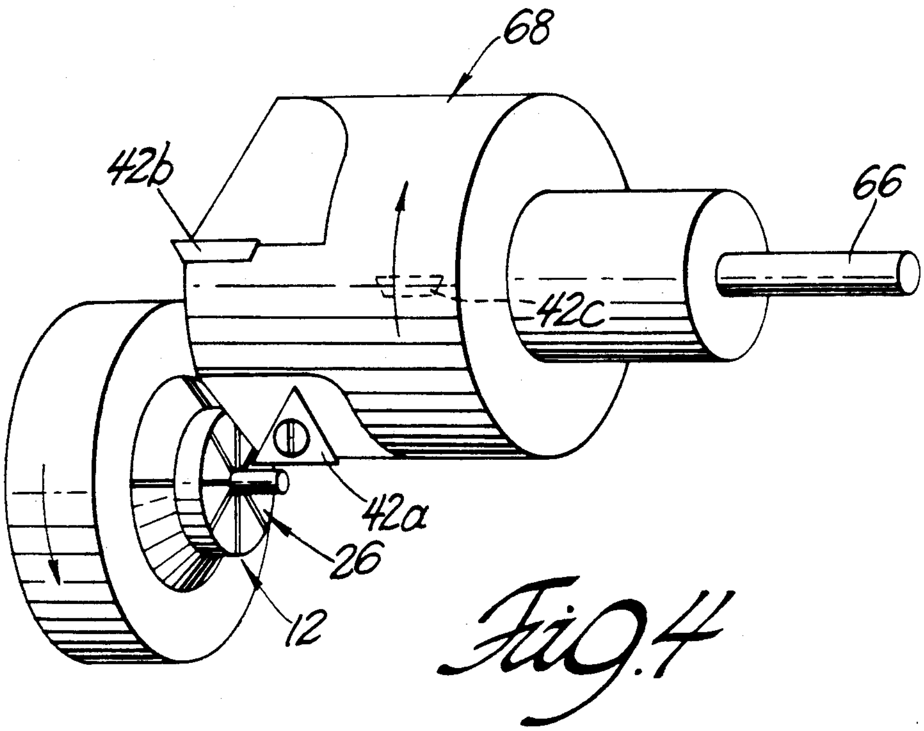
FIG. 4 is an enlarged perspective view of commutator work holder and cutter tool holder components of the apparatus of FIG. 1.
Figure 5:
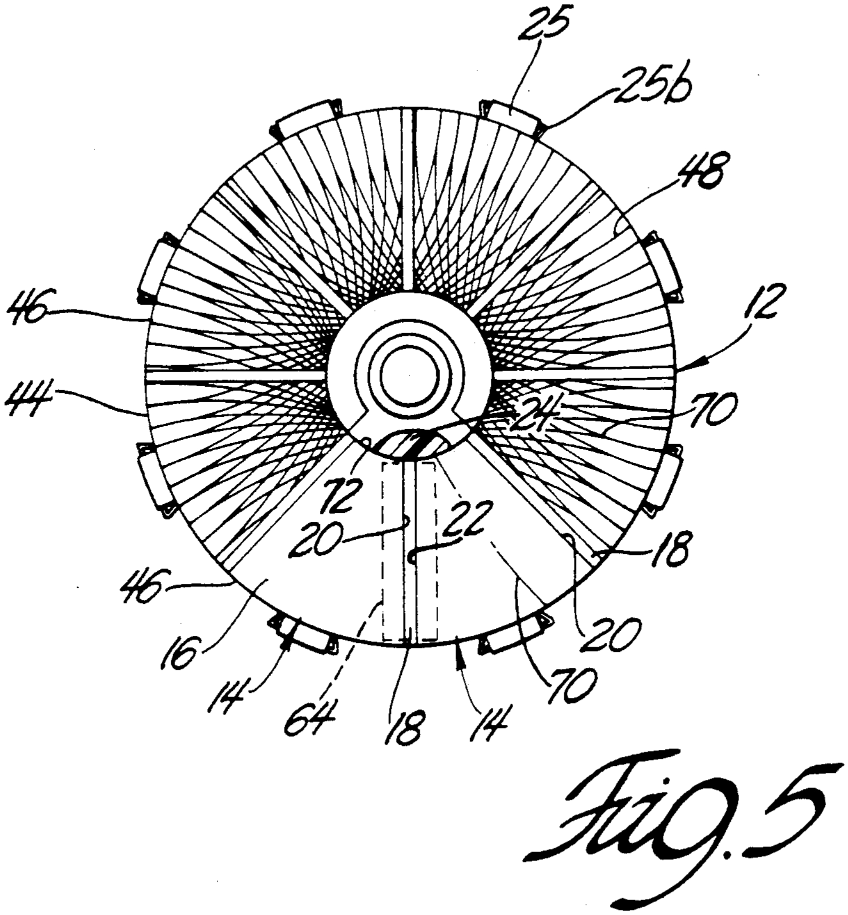
FIG. 5 is an enlarged end elevational view of a radial face type commutator showing a tool pattern formed thereon by the apparatus and tool holder of FIG. 4.

As best seen in FIG. 4, each of the conductor segments 14 is separated by slots 18. Each of the conductor segments 14 have a side edge 20, 22 forming the side surfaces of each of the slots 18. Each of the slots 18 electrically insulate the individual conductor segments 14 one from the other and the segments are supported on a rotor 24 of suitable dielectric material such as an electrically insulating plastic having high strength properties. Suitable tabs 25 have wire ends 25*a* wrapped thereon to provide power to windings on a motor armature 25*b* (FIGS. 3 and 4).

One characteristic of such commutators 12 is that the preassembly of the individual conductor segments 14 can result in unevenness at the margins of the conductor segments 14. In order to remove such unevenness and to form a machined surface on the face 26 of the commutator 12 the machine apparatus 10 includes a cutter spindle 28, a brush assembly 30 and an abrasive wheel spindle assembly 32.

The machine apparatus further includes a rotatable dial 34. The dial 34 has a shaft 34*a* rotatably supported on a machine base 36 by a journal bearing 36*a*. Journal bearing 36*a* supports shaft 34*a* for connection to a rotary drive 37.

The rotatable dial 34 has a plurality of individually rotatable work holders 38 thereon each of which are operable to be positioned in first, second and third machining positions adjacent the cutter spindle 28, the brush assembly 30 and the grinder assembly 32, respectively.

The machine apparatus includes a feed chute or input track 39 in which preassembled unfinished commutators 12 are located for feeding individual ones of the face type commutators 12 to individually rotatable work holders 36. Each of the work holders 38 includes adjustable collets 40 that will connect the body of the motor armature 25*b* to the rotatable dial 34 so as to secure each of the commutators 12 to the rotatable dial 34 for movement therewith.

The first machining position of the rotatable dial 34 positions a commutator 12 at the cutter spindle 28. The cutter spindle 28 has a plurality of single point cutter inserts 42 located with respect to the rotatable dial 34 and operative when the rotatable dial 34 is in its first machining position to form a tool pattern on each conductor segment 14 without forming slot burrs. The pattern includes a radially inwardly located cross-hatch pattern 44 which becomes progressively open toward the radially outermost edge 46 of each of the conductor segments 14 an which ends in a series of generally radially directed single line segments 48 at the radially outer portion of each of said conductor segments !4. The cutter spindle 28 is mounted on a slide 49 secured by suitable means to the machine base 36.

The brush assembly 30 has a motor 50 supported on a slide 52 mounted on the machine base 36. The slide 52 is connected to a suitable ball screw drive (not shown) which will position the motor 50 so as to locate its drive shaft 54 at a point where brushes 56 connected thereto will sweep across the surface of the conductor segments 14 to remove chips from the slots 18 produced by the cutter spindle 28. As well be more particularly set-forth herein, the chips which are formed therein during the formation of the cutter tool pattern are separated from the conductor segments 14 without forming burrs at the edges 20, 22.

The abrasive wheel spindle assembly 32 is mounted on a slide 58 connected to the machine base 36. The slide 58 is operatively connected to suitable drive components such a ball screw drive (not shown) which will position the spindle 32 to locate a hollow cylinder grinder tool 60 on the spindle shaft 62 so as to sweep the surface 26 to remove irregularities therefrom and to from a cycloidal wear pattern thereon of a form as described in U.S. Pat. No. 4,525,957 which removes remaining irregularities from the surface 26 while concurrently producing a surface roughness on each of the conductor segments 14 which is suitable for run-in machining a surface of a brush component 64 (shown in hidden line outline in FIG. 4) to assure full contact of the mating surfaces on the brush 64 and the conductor segments 14. The run-in machining is more fully discussed in the '957 patent. The roughness pattern produced by the abrasive wheel spindle assembly 32 on each of said conductor segments 14 is selected to accommodate a range of brush material hardness in an assembled commutator assembly.

Referring now to FIG. 3, the relationship between the work holder 38, the commutator face 26 and the cutter spindle 28 is diagrammatically shown to demonstrate that the commutator 12 and cutter inserts 42 are counter rotated during the initial metal removal operation. Specifically the spindle 28 has its output shaft 66 connected to a cutter holder 68. The cutter holder 68 has three circumferentially spaced cutter inserts 42*a*, 42*b* and 42*c* supported at the end thereof to locate single point cutting edges thereof in a position to traverse the full extent of the surface 26 as the cutter holder 68 is rotated. Each of the single point tips 42*d* of each insert 42*a–c* thereby sweeps along a curvilinear path 70 beginning at the radially innermost edge 72 of a conductor segment 14 to the radially outermost edge 46 thereof. Because of the relative speed of rotation selected in practicing the invention the single points will draw outwardly along the edges 20, 22 to constantly and repeatedly finish the edges in a manner which prevents the formation of burrs thereon. Consequently the separate burr removal process set forth in U.S. Pat. No. 4,686,730 is automatically achieved during initial machining.

The method includes the steps of holding a commutator 12 in one of the work holders 38. The process includes rotating a loaded commutator 12 from the loading station 39*a* one sixth of a rotary dial revolution clockwise as viewed in FIG. 2. At this position the holding collet 40 is rotated at an appropriate speed (in one embodiment, 60 R.P.M.) by an input drive provided by separate rubber drive wheels 74, 76, 78 located on bearing blocks 80, 82, 84, respectively. When the holding collets are indexed into alignment with the cutter spindle 28, the brush spindle 30 and the abrasive wheel spindle 32, the rubber drive wheels 74, 76, 78 are positioned to drive collet driver pulleys 86 so as to produce desired work holder rotation. Input drive is from a drive motor 88 via chain sprockets 90 and drive chains 92.

As the dials 34 rotate one-sixth of a revolution, the collet driver pulleys 86 engage with the continuous rubber driver wheels (at the appropriate stations) the collets are in turn driven at an appropriate speed.

The process includes simultaneously driving the three toothed cutter holders 68 at six thousand six hundred R.P.M., more than 100 times faster than the holding collet rotation (e.g., two orders of magnitude), while driving the cutter holder 68 on slide 49 by a ball screw drive (not shown) until the cutter inserts 42*a–c* remove a desired metal thickness from the commutator face 26. The cutter feed continues until the predetermined amount of material is machined from the commutator face 26 by a repetitive single tooth pattern which finishes the slot edges so as to prevent slot burrs.

Following initial machining of the commutator 12, the rotatable dial 34 indexes another one sixth revolution to align the burr free, machined commutator 12 with the rotating brush 56. Brush 56 removes any loose chips from the face 26 of the commutator 12. Another index of one sixth revolution of the rotatable dial 34 aligns commutator surface 26 with the automatic grinding spindle 32 which is operative to provide a final surface roughness on the commutator face 26 to assure good run in between the commutator and associated brush components of an electric motor.

The process is fully automatic, and the speed of production is increased since the cutter inserts 42*a–c* are operated to eliminate burrs from the slots 18 during initial machining. Consequently, there is no need to transport and fixture the initially machined commutator in a separate fixture to perform a slot picking operation thereon to remove burrs and foreign material from such slots.

The invention has been described in an illustrative manner, and it is understood that the terminology used is intended as words of description and not of limitation. Obviously many modifications and variations of the invention are possible in light of the above teachings. It is to be understood that within the scope of the appended claims, the invention may be practiced other than as specifically described.

The embodiments in which an exclusive property or privilege is claimed are defined as follows:

1. A process for finishing the full radial surface of a radial face type commutator having a longitudinal axis and further having a plurality of conductor segments each including a radially inwardly located edge and a radially outer edge joined by radial edges forming slots between each of the conductor segments comprising the steps of:

rotating the commutator on its longitudinal axis;

providing a cutter tool with a plurality of cimferentially spaced cutting inserts thereon each having a tip portion located on the outer radius of said cutter tool for cutting material;

rotating the commutator along its longitudinal axis while simultaneously rotating said cutter tool with respect to said rotating commutator to cause said tip portions to remove metal from said conductor segments;

removing a predetermined thickness of material from the face of each of said conductor segments while simultaneously moving the tool tips along a slightly curved substantially radial path which directs said tip portion along the radial edges of the conductor segments for finishing the radial edges of the conductor segments as burr free surfaces.

2. In the process of claim 1, advancing the cutter tool by providing a relative rate of rotation of the cutter tool and the commutator so as to produce periodic tool patterns on each of the conductor segments which sweep generally radially from radially inwardly of each of the conductor segments of the commutator to the radial outer edge of each of the conductor segments thereof.

3. A process for finishing the full radial surface of a radial face type commutator having a longitudinal axis and further having a plurality of conductor segments each including a radially inwardly located inner edge and a radially outwardly located outer edge joined by radial edges forming slots between each of the conductor segments comprising the steps of:

rotating the commutator on its longitudinal axis;

providing a cutter tool with a plurality of circumferentially spaced cutting inserts thereon each having a tip portion for cutting material;

rotating the commutator along its longitudinal axis while simultaneously rotating said cutter tool with respect to said rotating commutator;

removing a predetermined thickness of material from the face of each of said conductor segments by advancing said tip portions with respect to said conductor segments to remove metal from said conductor segments while forming a tool pattern on the face of each of said conductor segments while simultaneously finishing said radial edges of the conductor segments to have burr free surfaces;

said advancing step including relatively rotating the commutator and said cutter tool at a relative speed that combined with the provided plurality of circumferentially spaced cutting inserts and radially located tip portion produces a tool pattern adjacent the inner edges of each of the conductor segments that is a cross-hatch pattern that becomes progressively open in the direction of the radially outer edge of each of the conductor segments and which tool pattern ends in a series of generally radially directed substantially single line segments from the most open portion of said cross-hatch pattern to the radially outer edges of the conductor segments for causing the tip portions of the inserts to finish the radial edges of the conductor segments to have burrless surfaces thereon.

* * * * *